United States Patent [19]

Parlato

[11] 4,148,296
[45] Apr. 10, 1979

[54] SOLAR HEATING APPARATUS AND MOUNTING THEREFOR

[76] Inventor: Philip Parlato, 64 Primrose La., Kings Park, N.Y. 11754

[21] Appl. No.: 855,285

[22] Filed: Nov. 28, 1977

[51] Int. Cl.² .................................................. F24J 3/02
[52] U.S. Cl. ................................. 126/270; 126/271; 237/1 A
[58] Field of Search ................ 126/270, 271; 52/81, 52/86, 200; 237/1 A; 165/185

[56] References Cited

U.S. PATENT DOCUMENTS

| | | | |
|---|---|---|---|
| 4,000,851 | 1/1977 | Heilemann | 126/271 |
| 4,016,860 | 4/1977 | Moan | 126/271 |
| 4,059,094 | 11/1977 | Mendoza | 126/271 |
| 4,086,913 | 5/1978 | Gavin | 126/271 |

*Primary Examiner*—Casmir A. Nunberg
*Attorney, Agent, or Firm*—Stanley Ira Laughlin

[57] ABSTRACT

Solar heating apparatus comprising units that can be assembled on roofs and outer side walls of buildings easily to give the buildings an aesthetic beauty.

6 Claims, 4 Drawing Figures

SOLAR HEATING APPARATUS AND MOUNTING THEREFOR

BACKGROUND OF THE INVENTION

The invention relates to solar heating apparatus, and more particularly to apparatus for heating homes and the like by solar devices, such as found in Class 126, subclasses 270 and 271.

Apparatus for employing solar energy for heating homes are well known. However, the equipment presently in use is large and bulky; requiring heavy construction equipment and techniques for its installation. Furthermore, the present solar heating apparatus when installed upon a structure doesn't harmonize with traditional architectual concepts after the installation.

It is an object of applicant's invention to provide solar heating apparatus which is complete within each unit or section, and which can be assembled and installed easily by anyone without the employment of heavy construction equipment.

It is a further object of applicant's invention to provide solar heating apparatus which is safe and economical to operate and maintain.

It is yet a further object of applicant's invention to provide solar heating apparatus that is pleasing to one's eyes and conforms to traditional architectural designs of dwellings, homes, and the like.

SUMMARY OF THE INVENTION

Applicant's invention relates to a plurality of individual solar heating units which can be arranged and interconnected on a roof or a wall of a building. The solar heating units are joined together one section at a time to form an assembled solar heating system. The units are capable of simulating roofing tile, siding or the like and result in an effect that is pleasing to the traditional appearance of the building.

BRIEF DESCRIPTION OF THE DRAWING

In order that applicant's invention may be more clearly understood, it will now be described by way of one of its embodiments with reference to the drawing wherein:

FIG. 1 is an isometric drawing of applicant's solar heating apparatus.

DETAILED DESCRIPTION OF THE INVENTION

Figure 4:
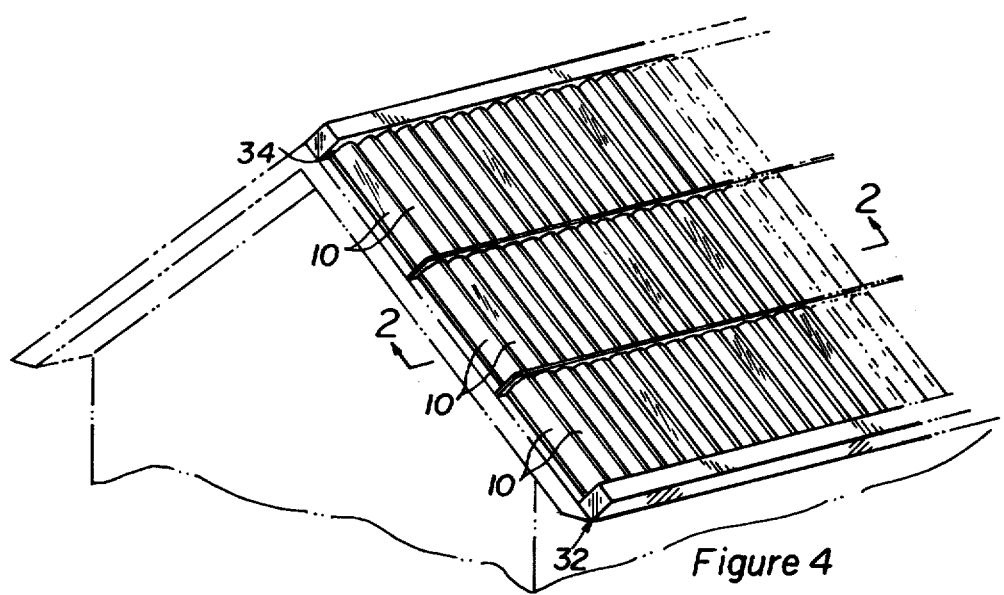
FIG. 4 is an isometric projection of applicant's apparatus installed upon a roof.

Applicant's semi-hemispherical, double-walled, complete unit solar heating apparatus differs from the cylindrical, double-walled or vacuum chamber jacket apparatus presently employed because applicant's apparatus can be assembled at the jobsite by anyone without the aid of heavy construction equipment such as cranes, riggings, etc. Furthermore, applicant's apparatus is designed to render a pleasing effect to the structure upon which it is installed; either appearing as roof tile, if installed upon the roof of the structure, or a dimensional siding if mounted upon the exterior side wall of the building.

FIG. 1 shows a plurality of applicant's extruded plastic formed to illustrate the interconnections and mounting in a very easy to understand fashion. A semi-hemispherical, extruded clear plastic structure essentially consisting either of acrylic or poly-carbonate shown as reference number 10, having a double wall at its upper half which can employ a vacuum chamber, and a substantially flat or rectangular lower half employing a single flange extending along the length of one side of the apparatus for clamping by device 12. A double flange extending along the length of the side opposite to the side having the single flange for interconnection with an adjacent structure, as well as preventing any movement of the structure by use of clamping device 14. Additional double flange extensions are shown interconnected and clamped at 14', 14", and 14'". Terminating or endcaps 15 and 15' are likewise illustrated for interconnection of longitudinally abutting structures in addition to supporting black metal pipe 28, through which the fluid to be heated by means of the solar rays passes.

Figure 2:
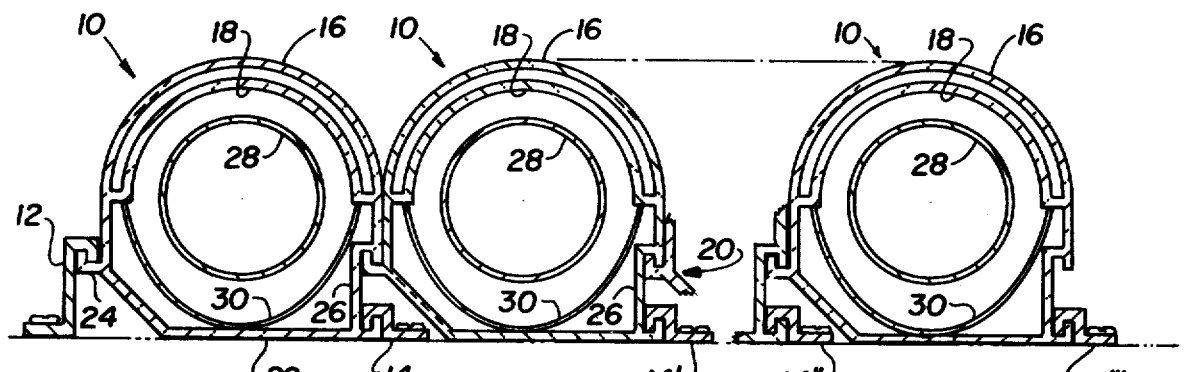
FIG. 2 is a front elevation view of applicant's structure shown in FIG. 1.

Applicant's clear plastic apparatus can be extruded at the job site similar to the way aluminum gutters are fabricated and is shown more specifically in the front elevation view of FIG. 2. An outer wall 16 and an inner wall 18 are the upper hemispheric section of the solar heating unit for receiving the solar energy rays. A lower section 20 comprises a substantially rectangular portion of the apparatus having a flat section 22 for supporting the apparatus on a roof or exterior side wall of a building. Extending out from the flat section on either side are flanges for interconnecting with abutting apparatus and/or tying down the apparatus to prevent movement due to weather or gravity. In applicant's illustrated embodiment, a single flange extends along the left-hand side for either receiving a clamping device 12, (shown in detail in FIG. 3) or for interconnection with the double flange 26 shown on the right-hand side of adjacent apparatus. It is noted that the double flange extension provides means for preventing movement by use of clamping devices 14, 14', 14", etc.

A black metal pipe 28 is supported within the apparatus by end caps 15 and 15' along a longitudinal axis equi-distant from the upper hemispheric and flat section parts of the apparatus. These pipes are interconnected to a fluid supply at one end and to utilization equipment at the other end so that the fluid to be heated passes through the solar heating apparatus thereby receiving heat from solar rays. The end caps 15 and 15' provide conventional means (not shown) for interconnecting black metal pipes 28 and adjacent abutting apparatus as well as providing means for supporting the black metal pipes 28. Aluminum foil 30 may be used to reflect rays passing to the lower section, thereby increasing the efficiency of the unit.

Figure 3:
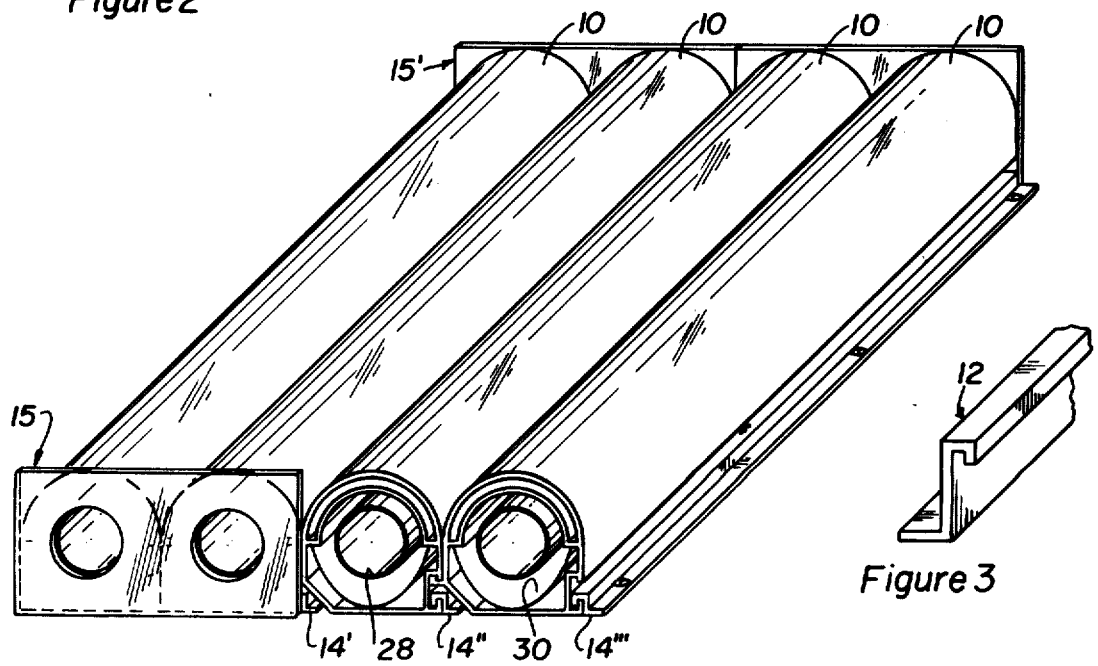
FIG. 3 is a detailed drawing of one embodiment of applicant's clamping device shown in FIG. 1.

FIG. 3 shows one of the clamping devices while the other is similar differing only in its dimensions. Clamping device 12 is employed in this embodiment to start the installation of the solar heating apparatus, and clamping device 14 is used to clamp the abutting apparatus.

FIG. 4 illustrates a plurality of applicant's inventive apparatus covering an entire roof section. Headers, such as shown as reference numbers 32 and 34 may be employed to receive the black metal pipes 28 and thereby redirect the heated fluid for most efficient operation. Applicant's apparatus can be just as easily mounted upon the exterior side wall of a building, and it may very well be to implement a desired effect that a combination roof and side wall installation will be called for. The method of assembling said plurality of individual solar heating apparatus comprises the steps of positioning and placing individual clear plastic solar heating members on a roof or exterior side wall of a building, clamping or tying down said member with clamping devices 12 and 14, interconnecting a second clear plastic member with the first member using end caps 15 and 15' as well as clamping devices 12 and 14, interconnecting a third member and so on until the installation is complete. The black metal pipes 28 may be interconnected with each other and with the headers, which can be made so as to appear as gutters, roof eaves, etc., at any time during the installation. When the installation is complete, it is then interconnected into the building's heating system.

Applicant's invention is applicable to the employment of conventional plastic extrusion techniques that may be employed at the job site to produce the individual clear plastic members in one long continuous length, or various lengths for easier handling.

Although only one embodiment of applicant's invention has been disclosed, it is understood that applicant's invention is not so limited, but shall be broadened to cover the scope of the claims annexed hereto.

I claim:

1. Solar heating apparatus for heating fluid by solar rays comprising clear plastic members having semi-hemispherical, double-walled upper parts for receiving the transmission of solar rays, a substantially rectangular lower part having flanges extending therefrom for mounting and interconnecting said apparatus to abutting apparatus, a black metal pipe located within said apparatus so as to receive heat from said solar rays, said black metal pipe storing and transmitting said fluid to be heated by solar rays, and end means for supporting said metal pipe and interconnecting said apparatus to abutting apparatus.

2. Apparatus as claimed in claim 1 wherein said clear plastic essentially consists of acrylic.

3. Apparatus as claimed in claim 1 wherein said clear plastic essentially consists of poly-carbonate.

4. Apparatus as claimed in claim 1 wherein said semi-hemispherical double-walled upper parts comprise vacuum means.

5. Apparatus as claimed in claim 1 wherein said flanges extend longitudinally along the sides of said apparatus.

6. Solar heating apparatus for heating fluids comprising a plurality of clear plastic extruded members, each of said members having a semi-hemispherical, double walled section for the transmission of solar rays, a substantially flat section opposite said semi-hemispherical surfaces, means for mounting and interconnecting said clear plastic members to form solar heating assembly, a plurality of black metal pipes for containing and transmitting said fluids positioned within said apparatus along a central longitudinal axis and means for supporting and interconnecting said apparatus.

* * * * *